United States Patent [19]

Davey

[11] Patent Number: 4,630,989
[45] Date of Patent: Dec. 23, 1986

[54] TRUCK RESTRAINT SYSTEM
[75] Inventor: Jack E. Davey, Brampton, Canada
[73] Assignee: Blue Giant Equipment of Canada Ltd., Brampton, Canada
[21] Appl. No.: 782,290
[22] Filed: Sep. 30, 1985
[51] Int. Cl.[4] ............ B65G 67/02; B65G 69/00
[52] U.S. Cl. ................................. 414/401; 14/71.1
[58] Field of Search ............ 414/401, 396; 14/71.1
[56] References Cited

U.S. PATENT DOCUMENTS

| 4,127,856 | 11/1978 | Bickel | 414/401 X |
| 4,267,748 | 5/1981 | Grunewald et al. | 414/401 X |
| 4,379,354 | 4/1983 | Hahn et al. | 14/71.3 |
| 4,488,325 | 12/1984 | Bennett et al. | 414/401 X |
| 4,555,211 | 11/1985 | Metz | 414/401 |

FOREIGN PATENT DOCUMENTS 1113697 12/1981 Canada .
1158812 12/1983 Canada .

Primary Examiner—Robert J. Spar
Assistant Examiner—Stuart J. Millman

[57] ABSTRACT

The device for restraining a truck or transport trailer at a loading dock comprises a frame having a vertical securing face and a lower horizontal securing face for mounting of the device to a structure such as a loading dock and at least partially supported by a driveway in front of the loading dock. A pivotal bar member having one end pivotally secured to the frame above and intermediate the length of the lower horizontal bearing face and outwardly of the vertical securing face is movable from a generally horizontal vehicle release position to a vehicle restraining position with the bar generally perpendicular to the lower horizontal bearing face. The bar is moved by a hydraulic cylinder pivotally secured adjacent the forward end of the lower horizontal securing face and pivotally secured to said bar member to be angled rearwardly towards said vertical securing face. The cylinder is pivotally secured to arms extending below the bar beyond the pivot securement of the bar to the frame. The hydraulic cylinder, when actuated to extend, forces the bar to move from the vehicle release position to the vehicle restraint position. The pivot connection of the bar is spaced from the vertical securing face at least about nine inches to accommodate therebetween a vehicle IC bar. The pivotal bar cooperates to define an area for confining an IC bar and restrain the IC bar in this confined area in the event that the truck or tractor trailer is advertently moved away from the loading dock without following the proper steps for disengaging the truck restraint system. The arrangement is such to place the cylinder in compression in the event of unauthorized removal of the truck or trailer, with a large portion of the load being transmitted to the horizontal bearing face.

11 Claims, 6 Drawing Figures

TRUCK RESTRAINT SYSTEM

BACKGROUND OF THE INVENTION

The present invention relates to vehicle restraint devices for use adjacent a loading dock. These devices restrict the movement of a truck or transport truck having an IC bar at the rear thereof by engaging or confining the IC bar such that the truck or trailer cannot be withdrawn from the loading dock with the restraint device in its operating position.

A number of prior art structures have been proposed as disclosed in the following patents:
 U.S. Pat. No. 4,208,161
 U.S. Pat. No. 4,282,621
 U.S. Pat. No. 4,379,354
 U.S. Pat. No. 4,127,856
 U.S. Pat. No. 4,443,150
 U.S. Pat. No. 4,146,888
 U.S. Pat. No. 4,264,259
 U.S. Pat. No. 4,373,847
 U.S. Pat. No. 4,472,099
 U.S. Pat. No. 4,267,748
 U.S. Pat. No. 4,400,127
 Canadian Pat. No. 1,113,697
 Canadian Pat. No. 1,158,812

Most of these devices are secured to a vertical face of the loading dock by a number of lug bolts which are preferably anchored in concrete. In some cases, this vertical face of the loading dock will be made of concrete block, and in fact will not have any significant strength with respect to a force applied in a direction generally perpendicular to the face of the dock. This obviously causes a problem as the force generated by the truck or trailer being withdrawn from the loading dock and restrained by the device, places a load on these lug bolts which is perpendicular to the face.

The prior art devices use various types of pivotal hooks for engaging the IC bar of the truck or transport trailer. These IC bars are not specifically designed for truck restraint systems and as such can have varying shapes and dimensions, although they are all spaced a given distance below the bed of the trailer or truck. Although it is not mandatory, these IC bars are normally placed closely adjacent the rear of the truck. The varying configuration of the IC bar results in truck restraint systems which will accommodate varying heights and shapes of IC bars and most of these devices include a movable carriage which moves upwardly to strike the IC bar and once so positioned, a hook is adjusted to positively engage the IC bar. Systems of this type have a number of advantages, in that the carriage is moved to ground level when not in use and is not particularly obstructive. In addition, the device is capable of accommodating varying configurations of IC bars and as such has a universal application. The transmission of force to the surrounding structure of the loading dock and the sophistication of the device which involves a movable carriage remains a problem.

Hook attachment of an IC bar can result in the hook being reluctant to disengage the IC bar if a slight shifting of the trailer at the loading dock occurs. Therefore, in some cases, the truck restraint systems which use hooks are prone to problems with respect to release of the vehicle.

SUMMARY OF THE INVENTION

According to the present invention, a vehicle restraint device is proposed for use with vehicles such as trucks and tractor trailers having IC bars adjacent the rear thereof. The device in contrast to the prior art provides an area of confinement for receiving and maintaining a truck IC bar in position when the truck or trailer is being unloaded. In the event the truck or trailer is inadvertently moved, a bar is contacted and the force of the IC bar is transmitted to a hydraulic cylinder placed in front of the restraining bar. This cylinder is placed in compression due to the force exerted on the bar by the IC bar of the truck or trailer and is transmitted to a lower horizontal bearing surface in contact with the driveway or the area immediately forward of the loading dock. Therefore, according to the present device, the vertical face of a loading dock or the vertical securing face of the device does not carry the entire force necessary to oppose accidental movement of the truck or trailer from the loading dock as a substantial portion of force is transmitted to the driveway. The pivotal bar of the device is movable from a horizontal position where a IC bar can pass thereover, and is movable to a generally vertical position defining an area of confinement between the loading dock and the vertical bar in which an IC bar is maintained. In most cases, the IC bar is not positively engaged, but it is merely confined within a given area and, therefore, the problems associated with disengagement of a hook from the IC bar is avoided. In addition, a substantial portion of the force caused by an inadvertent attempt to withdraw the IC bar from the confinement area is transmitted to the lower horizontal bearing surface of the frame rather than a vertical securing face of the frame such that the loading dock or a vertical wall thereof is not entirely relied on to offset the force necessary to retain the IC bar.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
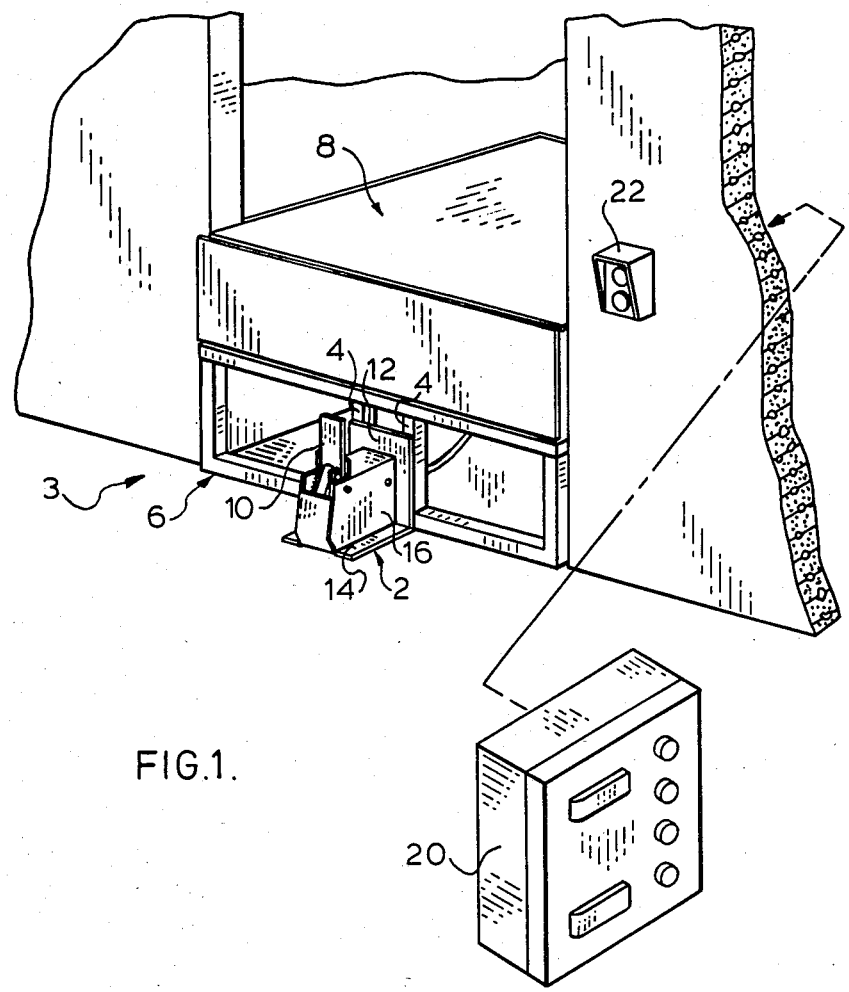
FIG. 1 is a perspective view of the device secured to the exposed vertical face of a loading dock.
Figure 2:
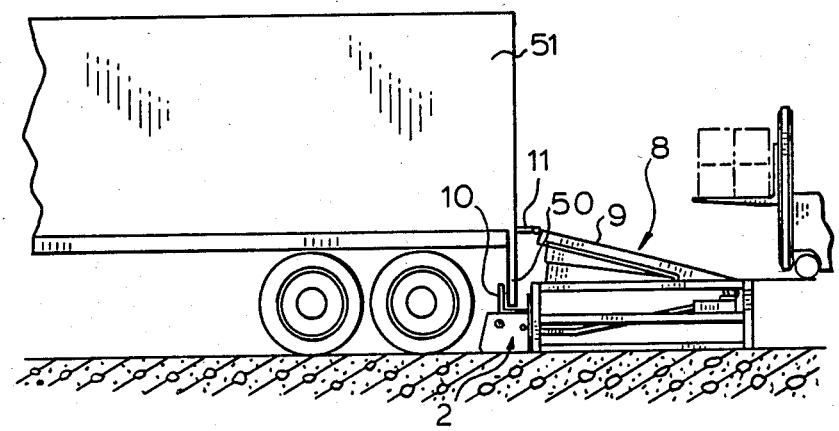
FIG. 2 is an elevation of the device and a loading dock.

The vehicle restraint device generally shown as 2 in the Figures is used at the forward face of the loading dock generally indicated as 3 and in the case of FIG. 1 has been secured to the vertical extending channels 4 forming part of the vertical face 6 of the loading dock 3. A dock leveller 8 allows the loading and unloading of a vehicle such as a truck bed or transport trailer generally indicated as 51 in FIG. 2. The dock leveller 8 has a platform 9 and a dock lip 11 which preferably are hydraulically actuated to allow adjustment to the various vehicles being loaded. The purpose of the vehicle restraint device 2 is to avoid removal of the vehicle 51 from the loading dock 3 during loading or unloading of the vehicle. By retaining the vehicle at the loading dock, danger to the shipping operator is reduced as accidental removal of the vehicle is avoided. The vehicle 51 is retained at the dock leveller as the IC bar 50 is confined within the IC bar confining area generally indicated as 52 behind the pivotal bar 10 of the vehicle restraint device 2. The IC bar would strike the pivotal bar 10 if the truck is attempted to be removed from the dock with the bar in the generally vertical position, thereby precluding unauthorized withdrawal of the truck.

Figure 4:
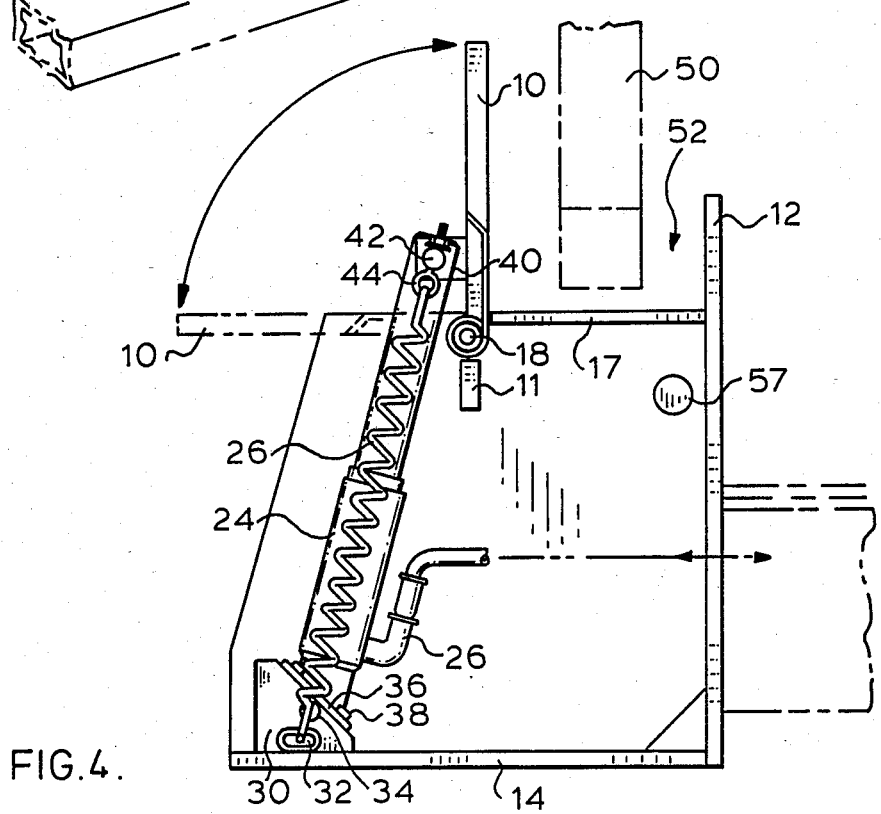
FIG. 4 is a side view of the device with the covers removed.

The vehicle restraining device 2 includes an interior control box generally indicated as 20 which is used to activate the restraining device and move the pivotal bar to the restraining position indicated in FIG. 1 or the vehicle release position shown in dotted lines in FIG. 4. The control box 20 also includes a green light indicating that the vehicle restraining device is in the vertical position as well as a red light which indicates that the restraining device is in the release position. To the exterior of the building, a signal box 22 is secured which again includes a green light and red light with the green light indicating that the restraining device is in the release position and the red light indicating that the pivotal bar is in the vertical position.

Figure 3:
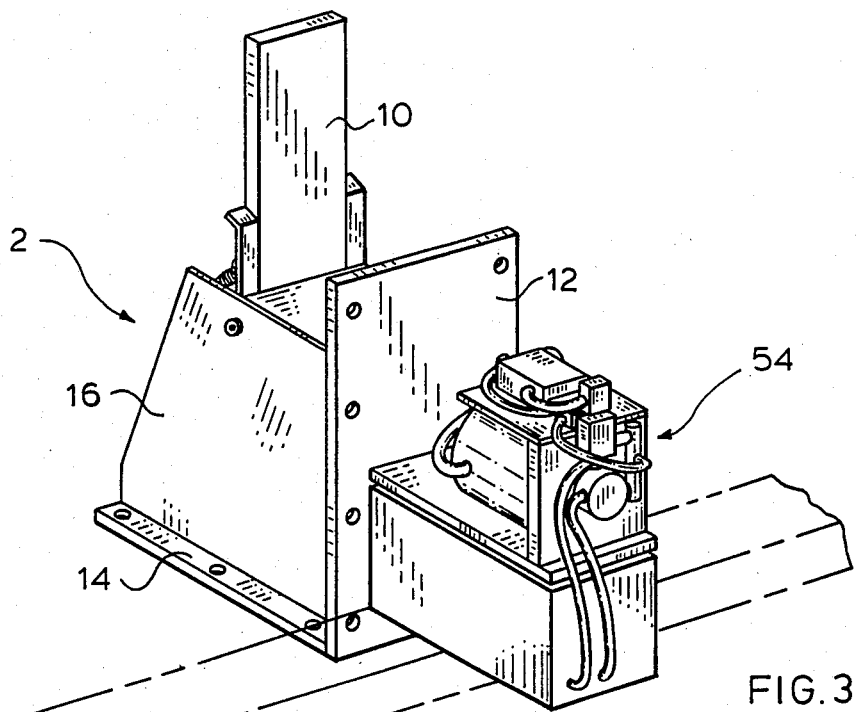
FIG. 3 is rear view of the vehicle restraint device.
Figure 5:
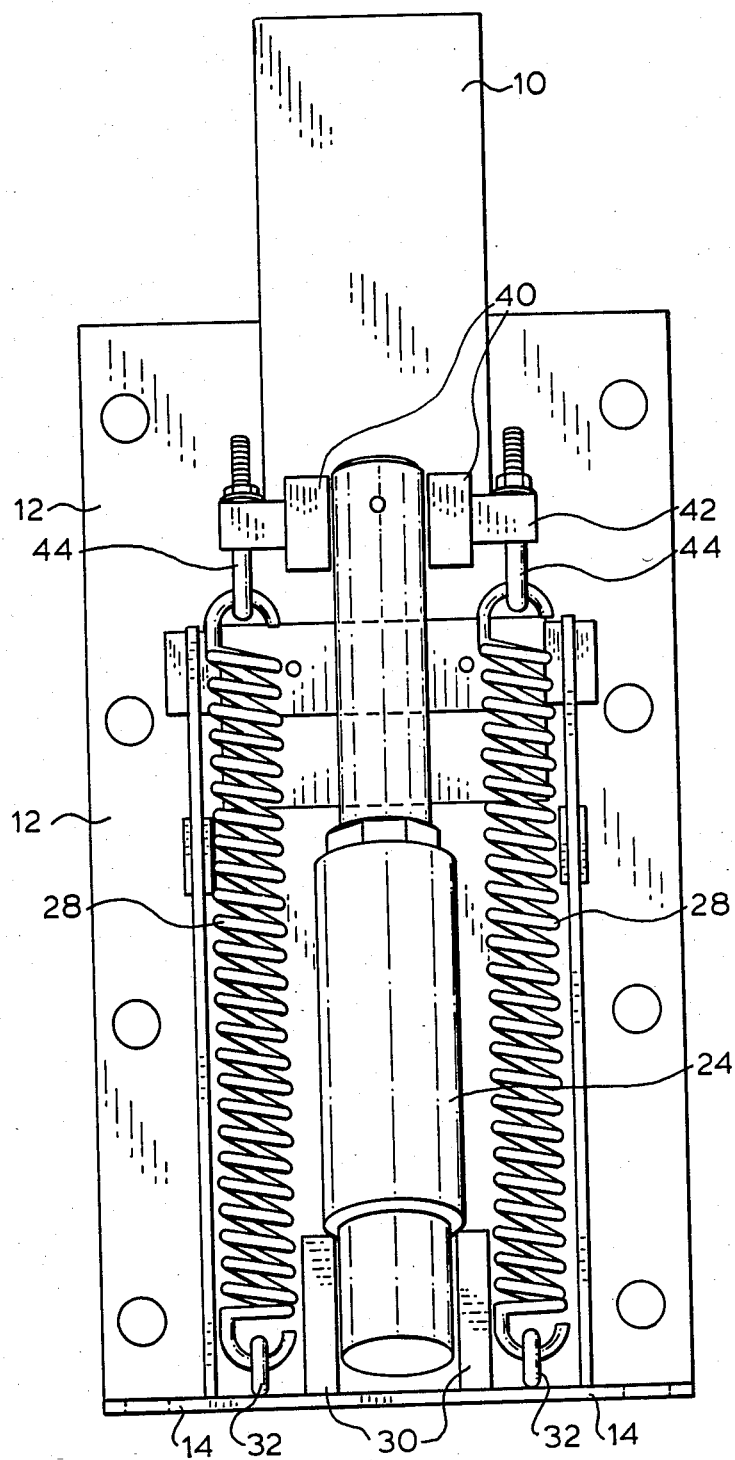
FIG. 5 is a front view of the device with the covers removed to expose the interior springs and hydraulic cylinder.

The restraining device 2 as more clearly indicated in FIGS. 3, 4 and 5 has a vertical securing face 12 as well as a horizontal securing or bearing face 14 for mounting the device at the foot of the loading dock 3. In a preferred embodiment as shown in FIG. 1, the device is secured to a steel frame of the dock leveller, however, in some cases the restraining device is used in a retrofit application where this area of the loading dock is merely a block or concrete wall. In this case, the device would be secured to the vertical face of the loading dock and in bearing relationship with the driveway portion at the foot of the loading dock.

The hydraulic cylinder 24 is used to control the position of the pivotal bar 10 and when the bar 10 is in the vertical position as shown in FIG. 4, the hydraulic cylinder 24 is generally vertical. The hydraulic cylinder is secured to the bar by stub arms 40, spaced from the pivotal connection 18 of the bar 10 to the side frame 16 of the device 2, such that a force urging the bar to the release position indicated by the dotted position of bar 10 in FIG. 4, causes a compressive load to be placed on the cylinder 24 which is transmitted to the lower horizontal bearing face 14. Perferably face 14 is also directly secured by lug bolts or anchors to the driveway. Therefore, if the IC bar 50 strikes the bar 10 in FIG. 4, a force is transmitted generally along the axis of the hydraulic cylinder 24 and transmitted to the horizontal bearing and securing face 14. In this way, the vertical face of the loading dock 3 need not be capable of withstanding the entire force necessary to restrain a vehicle at the loading dock. As can be appreciated, a block wall probably would fail prior to the device causing further damage and possibly contributing to a more serious accident. By the particular cooperation and securement of the hydraulic cylinder to the pivotal arm 10 and the lower horizontal securing and bearing face 14, the load carried by the securing members attached to the vertical face of the loading dock is reduced.

The hydraulic cylinder 24 is single acting and when extended will cause the pivotal bar 10 to move to the vertical position. Release of the hydraulic pressure within the cylinder 24 results in the arm 10 moving to the generally horizontal position as indicated in FIG. 4 due to the springs 24 biasing the arms to this position. The springs 26 are secured to shaft 42 which also secures the hydraulic cylinder 24 to the stub arms 40. The springs are attached to eye bolts 44 which pass through shaft 42 and allow adjustment of the spring tension exerted on stub arms 40. The opposite end of the springs 26 are secured to loop fasteners 32 secured to the upper surface of the lower horizontal securing face. Mounting brackets 30 are attached to the lower horizontal securing face 14 and receive shaft 34 which pivotally secures the lower end of the hydraulic cylinder 24. This shaft 34 is received in a slot in the mounting bracket 30 and is trapped within the slot by the retaining plate 36 secured to the mounting bracket 30 by bolt 38. The vertical securing face 12, the horizontal bearing and securing face 14, top plate 14 and side plates 16 form a frame of the device and collectively support the pivotal bar 10. In addition, the device includes a front cover plate 19 as shown in FIG. 6 for protecting of the hydraulic cylinder 24 and the springs 28.

The vehicle restraining device 2 can be sold as a stand-alone unit as generally indicated in FIG. 3, where a separate stand-alone hydraulic fluid pressure system 54 is shown. This hydraulic fluid pressure system 54 can be secured to the rear of the device if space permits or can be placed inside the building and connected to the restraining device 2 via a separate hydraulic fluid line shown as 56 in FIG. 6. This line 56 can be secured to the front face of the loading dock 3 with the hydraulic system 54 located interior to the building. This line 56 would pass through the port 57 shown in FIG. 54 for connection to the hydraulic line 26 of FIG. 4.

Figure 6:
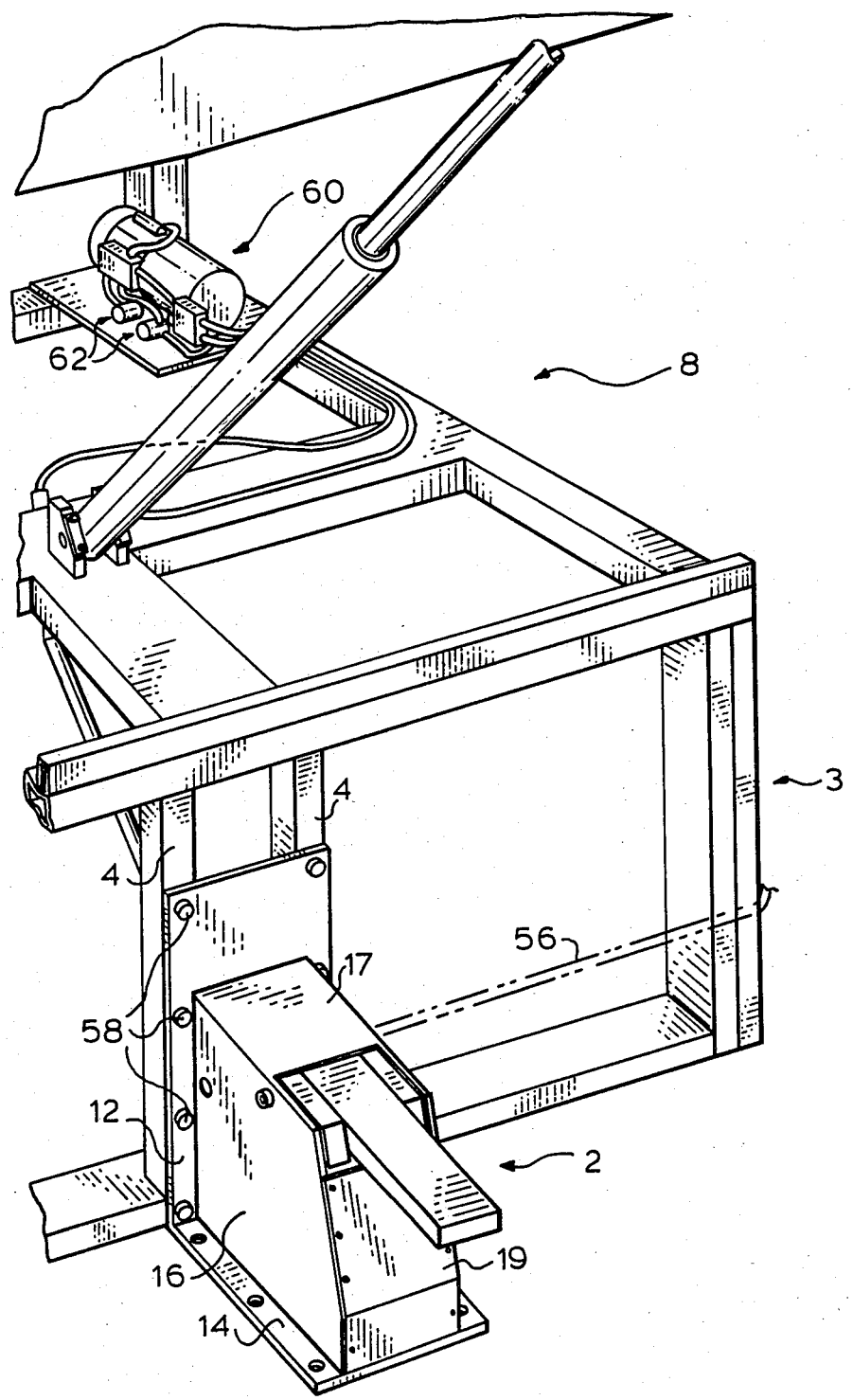
FIG. 6 is a partial perspective view of the vehicle restraint device secured to a loading dock.

In FIG. 6, the vehicle restraint device 2 is shown connected to the channels 4 of the dock leveller 8. In this case, one hydraulic fluid pressure system 60 is used which has a number of control valves 62 to isolate the hydraulic operation of the dock leveller 8 from the restraining device 2. In this way, the cost of hydraulically actuating the dock leveller and restraining device is reduced.

The truck restraining device 2 as shown in the drawings has a number of features which are an improvement over the prior art. The first one is the rugged construction of the device which transmits any loads exerted on the bar 10 to a horizontal surface rather than relying on the vertical surface 12 for restraining the truck or vehicle at the loading dock. Furthermore, the actuating mechanism namely the pivotal arm 10, the hydraulic cylinder 24 and the coil springs 26 can easily withstand the environmental conditions at the exterior of a loading dock and will provide reliable service. The fact that the device is stationary and merely provides a confining area 52 for receiving an IC bar 50 eliminates the need for a more sophisticated mechanism for allowing variations in the height of the IC bar 50. Also, in most cases the bar 10 is not loaded when an IC is retained. The pivotal bar 10 preferably has a extension 11 which engages the undersurface of the top plate 17 to provide the stop for the horizontal orientation of the bar shown in dotted lines in FIG. 4. Preferably the hydraulic cylinder 24 also includes an adjustable stop interior thereto which will determine the end position of the pivotal bar 10.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A device for restraining a vehicle, such as a truck or transport trailer, at a loading dock comprising a frame having a vertical securing face and a lower horizontal bearing face,
   a pivotal bar having one end pivotally secured to said frame above and intermediate the length of said lower bearing securing face and said vertical securing face,
   said pivotal bar being movable from a generally horizontal vehicle release position, with said bar generally parallel to said lower horizontal bearing face, to a vehicle restraining position with said bar generally perpendicular to said lower horizontal bearing face,
   a hydraulic cylinder pivotally secured adjacent the forward end of said lower horizontal bearing face and pivotally secured to said bar to be angled rearwardly towards said vertical securing face,
   said hydraulic cylinder being pivotally secured to arms secured to and extending below said bar beyond said pivot securement of said bar to said frame,
   said hydraulic cylinder when actuated to extend causing said bar to move from said horizontal vehicle release position to said vehicle restraint position,
   the pivot of said bar being spaced from the vertical securing face, at least about 9 inches to accommodate therebetween a vehicle IC bar.

2. A device as claimed in claim 1, wherein said pivot of said bar is spaced from said vertical securing face about 12 inches.

3. A device as claimed in claim 1 wherein said cylinder is single acting and said device includes spring means to bias said bar to the vehicle release position.

4. A device as claimed in claim 1, 2 or 3, wherein said cylinder is angled to transmit force generally perpendicular to said lower horizontal bearing face when a force is applied to said bar in the vehicle restraint position, urging said bar to the vehicle release position.

5. A device as claimed in claim 1, including a hydraulic fluid pressure source including controls for said hydraulic cylinder.

6. A device for restraining a vehicle having an IC bar, such as a truck or trailer adjacent the loading dock comprising a frame, a truck restraint bar having an end thereof pivotally secured to said frame and movable from a generally horizontal position to a generally upright position defining an IC bar confining area intermediate said bar and a portion of said frame,
   said bar in a horizontal position opening said confining area for receiving or withdrawing such an IC bar,
   a hydraulic cylinder pivotally secured to said frame outwardly of and below the pivot connection of said bar and pivotally secured to said bar at a position spaced from the pivot securement of said bar and frame,
   the securement of said cylinder to said frame and said cylinder to said bar resulting in said cylinder being generally placed in compression when said bar is in the truck restraint position and a force is applied thereto urging said bar to the generally horizontal position.

7. A device as claimed in claim 6, wherein said cylinder is secured to stub arms extending below said bar such that a force created by an IC bar in the confining area being withdrawn, with said bar in the restraint position, is opposed by said cylinder with the created force being generally along an axis of the cylinder and is transmitted to a front lower portion of said frame generally perpendicular thereto.

8. A device as claimed in claim 7, wherein said cylinder is single acting for moving said bar from said truck release position to said truck restraint position and said device includes spring means associated with said bar for biasing said bar to the truck restraint position.

9. A device as claimed in claim 8, wherein said bar extends either side of said pivot and a portion of said bar contacts said frame and stops said bar at the truck release position.

10. In combination a dock leveller and a device for restraining a truck or trailer having an IC bar adjacent the dock leveller, said dock leveller including a hydraulic fluid pressure source connected to a hydraulically actuated ramp and dock lip, and a vertical frame means along a vertical face of the dock leveller generally below the dock lip, said restraining device comprising a frame releasably attached to said frame means of said dock leveller forward of said vertical face, a truck restraining bar having one end thereof pivotally secured to said frame and the opposite end movable from a generally horizontal position to a generally vertical position defining an IC bar confining area intermediate said bar and said vertical face of said dock leveller,
    said bar in a horizontal position opening said confining area for receiving or withdrawing such an IC bar,
    a hydraulic cylinder pivotally secured to said frame outwardly of and below the pivot connection of said bar and pivotally secured to said bar at a position spaced from the pivot securement of said bar and frame,
    the securement of said cylinder to said frame and said cylinder to said bar resulting in said cylinder being generally placed in compression when said bar is in the truck restraint position and a force is applied thereto urging said bar to the generally horizontal position, said cylinder transmitting compressive force to a lower bearing surface of said frame spaced forwardly of the vertical face of said dock leveller.

11. In the combination as claimed in claim 10, wherein said cylinder is secured to stub arms extending below said bar such that a force urging said bar from the generally vertical position towards the horizontal position is opposed by said cylinder with the force being generally along an axis of the cylinder and is tranmitted to the front lower portion of said frame generally perpendicular thereto and generally along an axis of the cylinder.

* * * * *